Feb. 16, 1954

W. H. SILVER ET AL 2,669,171

DISK TILLER

Filed Oct. 9, 1948

Inventors:
WALTER H. SILVER
JOHN I. CANTRAL
ATTORNEYS

Feb. 16, 1954    W. H. SILVER ET AL    2,669,171
DISK TILLER

Filed Oct. 9, 1948    9 Sheets-Sheet 3

Inventors:
WALTER H. SILVER
JOHN I. CANTRAL

ATTORNEYS

Feb. 16, 1954   W. H. SILVER ET AL   2,669,171
DISK TILLER
Filed Oct. 9, 1948   9 Sheets-Sheet 9

INVENTORS
WALTER H. SILVER
JOHN I. CANTRAL
BY
ATTORNEYS

Patented Feb. 16, 1954

2,669,171

UNITED STATES PATENT OFFICE 2,669,171

DISK TILLER

Walter H. Silver and John I. Cantral, Moline, Ill., assignors to Deere & Company, Moline, Ill., a corporation of Illinois Application October 9, 1948, Serial No. 53,716

14 Claims. (Cl. 97—53)

This application is a continuation-in-part of our co-pending application, Serial No. 742,234, filed April 18, 1947, for Disk Tillers.

The present invention relates generally to agricultural implements and more particularly to ground working implements of the type commonly known as disk tillers.

The object and general nature of the present invention is the provision of a novel disk tiller having exceptionally large capacity and which is adapted to work a strip of ground much wider than conventional disk tillers. More particularly, it is a feature of this invention to provide a disk tiller or similar implement having a plurality of ground working units, each of which is flexibly mounted so as to operate effectively over ground which is uneven or rough. More specifically, it is an important feature of this invention to provide a ground working implement having a plurality of gangs of disks, wherein the gangs are axially aligned so as to operate over a wide strip of ground and so connected with a supporting frame that one end of each gang unit may rise or fall relative to the other end so as to work the ground at a uniform depth irrespective of humps, hollows or other surface irregularities.

It is also an important feature of this invention to provide means, while accommodating the above mentioned flexible mounting of the disk gangs, especially constructed and arranged to apply downward pressure against the ends of the disk gangs so as to act to force them down into their working position or hold them in a working position. It is an additional feature of this invention to connect the disk gangs in axial alignment so that any tendency for one end of each gang to run too deep is offset by a connection to the adjacent end of the adjacent gang so as to secure thereby substantial uniformity of operation. Specifically, the gang units, which are ordinarily arranged diagonally, have their front and rear ends connected, respectively, with the rear and front ends of the next adjacent gangs, whereby the several gangs may float with respect to the supporting frame but without having either end of any one gang run too deep or too shallow as compared with the other end of that gang.

Another important feature of the present invention is the provision of a new and improved frame structure for a disk implement of the wide spread type.

A further feature of the present invention is the provision of a disk tiller having a plurality of gangs of disks arranged in individually movable relation but interconnected endwise, and a still further feature of the present invention is the provision of a sectionalized frame in which each gang of disks is mounted on its own frame section, in conjunction with detachable means interconnecting the disk sections and detachable connecting means between the frame sections, whereby the size of the implement may be increased or decreased by adding or taking away one or more of the disk sections and the associated frame section.

These and other objects and advantages of the present invention will be apparent to those skilled in the art after a consideration of the following detailed description, taken in conjunction with the accompanying drawings.

In the drawings:

Figures 11 and 11A are complementary plan views, showing a modified form of disk tiller, in which the disk gangs are mounted on individual frame sections so as to provide for adding or substracting one or more of such sections and the associated disk gang or gangs for increasing or decreasing the size of the implement.

Figure 14 is a fragmentary sectional view taken along the line 14—14 of Figure 11A.

Figures 1, 8:
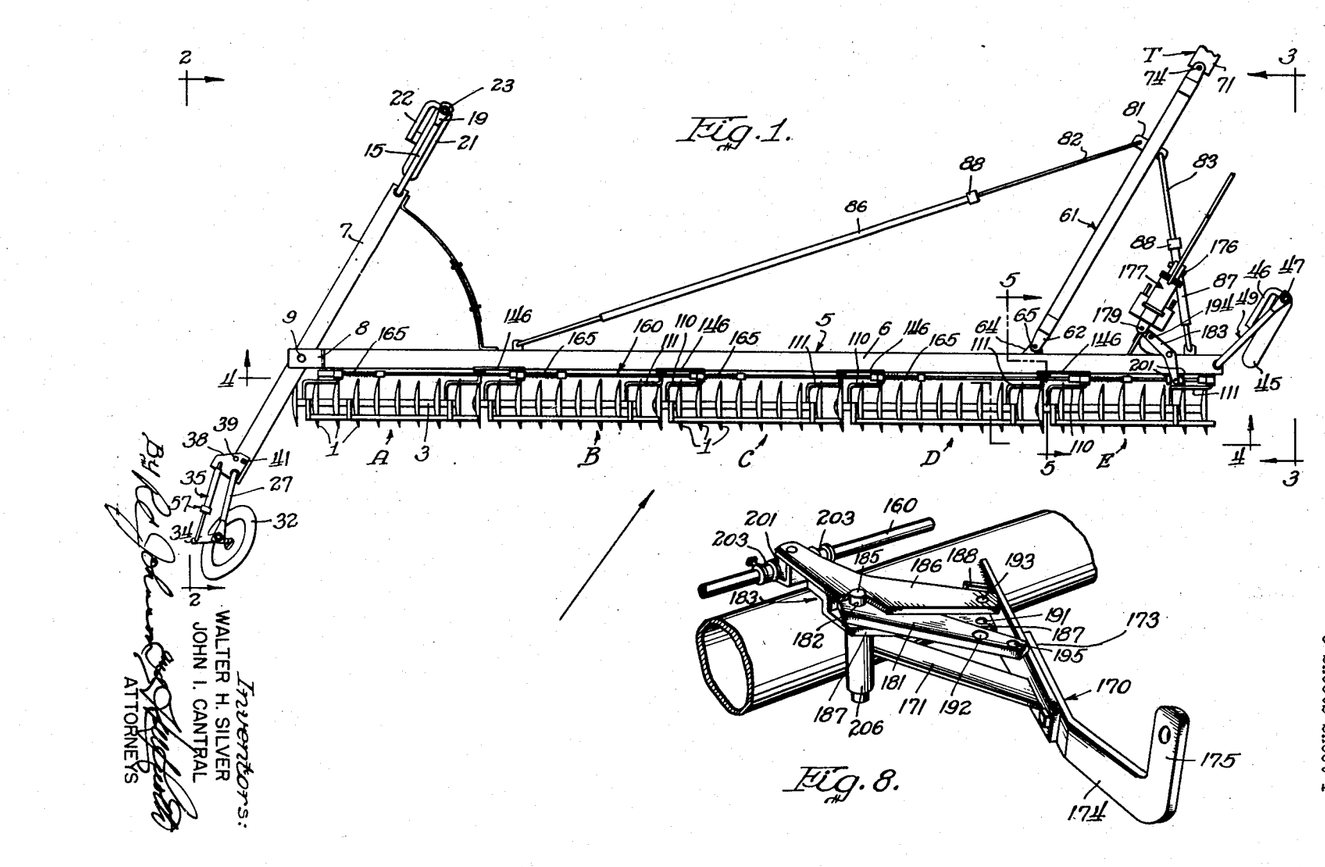
Figure 1 is a plan view of a tractor drawn disk tiller, in which the principles of the present invention have been incorporated.
Figure 8 is an enlarged fragmentary perspective showing the hydraulic cylinder mounting parts, with the cylinder detached.

Referring first to Figure 1, one form of implement in which the principles of the present invention have been embodied, and illustrated in the drawings by way of example, is a disk tiller comprising a plurality of gangs of disks A, B, etc., each gang made up of a plurality of disks 1 mounted on a gang bolt 2 and held in spaced apart relation by spools or spacers 3, and at the ends of each gang bearing means are provided which will be described in detail below.

Figure 2:
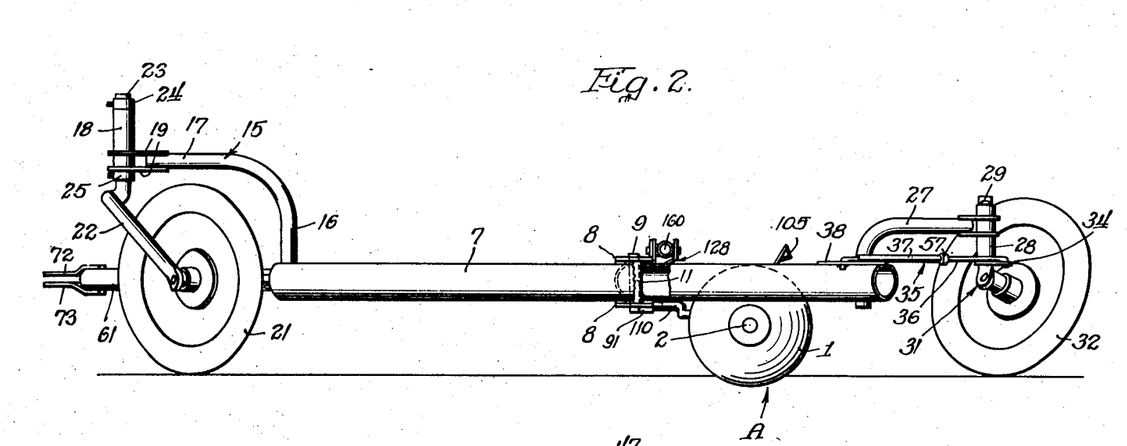
Figure 2 is an end view, showing the rear or outer end of the disk tiller and the land and furrow wheels therefor.

The gangs of disks are supported in a flexible manner on a main frame that is indicated in its entirety by the reference numeral 5. The frame 5 is made up of a diagonally disposed tubular member 6, preferably of round pipe stock, and a generally fore and aft tubular member 7, also preferably formed of round pipe stock. The rear end of the main tubular member 6 has a bifurcated section 8, the upper and lower arms of which are spaced apart vertically and apertured to receive a pivot pin 9 which connects the member 6 swingably with the member 7. To this end, the central portion of the member 7 may carry a vertical bearing bushing 11 (Figure 2) or other suitable construction to receive the pivot pin 9.

A bracket 15 is fixed to the forward end of the landward frame member 7 and includes a rear vertical portion 16 that is secured, as by welding, to the front end of the member 7 and an upper or forwardly extending section 17, to the forward portion of which a sleeve 18 is fixed, as by welding, and reenforced by a pair of gusset plates 19 or the like. A land wheel 21 is carried at the lower end of a support 22, the upper and forward portion of which is formed as a spindle 23 and rotatably disposed in the sleeve 18. Upper and lower set screw collars 24 and 25 are employed for holding the spindle in position while accommodating full castering of the land wheel 21. A rear furrow wheel support 27 is adjustably connected at its forward end to the rear end of the landward frame member 7 and carries a sleeve 28 in which the spindle 29 of a rear furrow wheel axle 31 is received. The axle 31 includes a downward and furrowward extension on which a rear furrow wheel 32 is mounted, and the spindle portion 29 is provided with an arm 34 secured thereto and apertured at its outer end to receive an adjusting link 35 which preferably is made up of two telescopically associated sections 36 and 37, the latter being pivotally connected in any suitable way to the rear end of the landward frame member 7, preferably by means of a plate 38 which is welded to the support 27 and has a plurality of apertures 39 receiving a bolt 41 which is carried by the frame member 7 and which accommodates disposition of the furrow wheel support 27 in different angular positions, whereby it is possible to set the furrow wheel 32 in different positions relative to the frame 5. The link section 36 is pivotally connected at its outer end to the arm 34.

Figure 3:
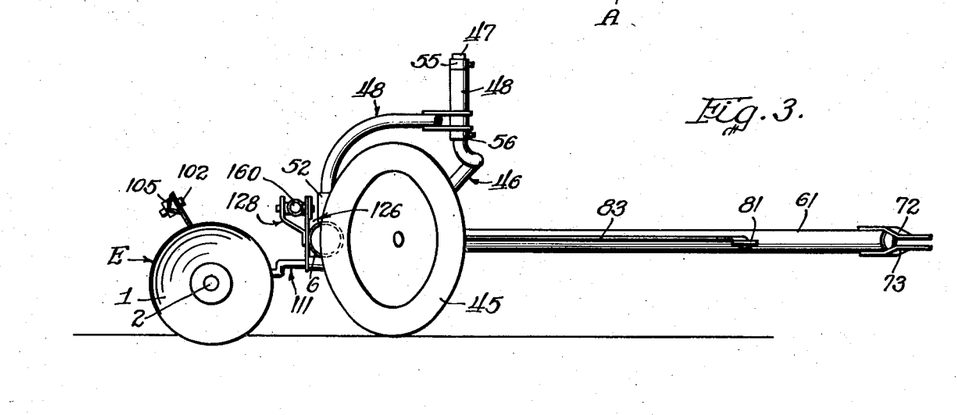
Figure 3 is an end view at the front of the tiller, showing the front land wheel and associated parts.

The forward end of the diagonal frame member 6 is supported on a forward furrow wheel 45 which is journaled on the lower end of an axle member 46, the upper portion 47 of which is formed as a spindle to receive a sleeve 48 that is carried by the upper forward end of a front wheel support member or bracket 49. The latter may be fixed to the front end of the frame member 6 in the same manner as described above in connection with the land wheel support bracket 15, but preferably the position of the front wheel 45 may be adjusted laterally, and to this end the front end of the main frame member 6 carries a sleeve section 52 which receives the lower and rear portion of the bracket 49, the latter being suitably held in the member 52 in different positions of adjustment by any suitable locking means, such as a set screw 53 or the like. If desired, the land wheel support member 15 may be connected to the front end of the frame member 7 in the manner just described for the bracket 49. The upper portion of the spindle 47 carries set screw collars 55 and 56 (Figure 3) at the upper and lower ends of the sleeve sections 49, whereby the front wheel 45 may caster. Also, the vertical position of the frame relative to the wheels 21 and 45 may be adjusted by loosening the set screw collars 55 and 56 and shifting them into different positions so as to carry the frame at higher or lower positions, as desired. Generally it is not necessary to adjust the vertical position of the furrow wheel 32, but if so desired, the spindle portion 29 of the axle member 31 may likewise carry set screw collars at opposite ends of the sleeve section 28. The link member 37 preferably carries an adjusting set screw clamp collar 57 which provides for changing the effective length of the link member 35 so as to change the lead of the rear furrow wheel 32.

The implement frame 5 may be connected to a propelling tractor T by any suitable hitch construction, but preferably, according to the principles of the present invention, a relatively heavy draft member 61 is connected by upper and lower plates 62 and 63 to a draft stud 64 welded to the generally central portion of the main frame member 6. The stud 64 is apertured to receive a draft pin 65 which passes through apertures in the rear ends of the plates 62 and 63. Preferably, the latter plates are bolted to the rear end of the main draft member 61. The forward end of the draft member 61 is connected to the drawbar 71 of the tractor T by a similar construction, embodying upper and lower plates 72 and 73 apertured to receive a hitch pin 74 that connects the front end of the hitch member 61 to the tractor drawbar 71. The plates 72 and 73 preferably are bolted to the front end of the hitch member 61. The latter member is provided with a transverse clip 81 apertured at its opposite ends to receive the downturned ends of angle adjusting rods 82 and 83. The rear end of the hitch rod 82 is received telescopically in a tubular member 86 that is pivotally connected in any suitable way to the forward portion of the main frame member 6, and the rear end of the other hitch rod 83 is likewise received in a tubular member 87 that is pivotally connected to the rear portion of the frame member 6. Clamping set screw collars 88 are provided for holding the members 82, 86 and 83, 87 in different positions of adjustment.

Reference was made above to the fact that the disks gangs A, B, etc., are flexibly connected with the main frame 5 of the implement. These connections will now be described.

Figure 5:
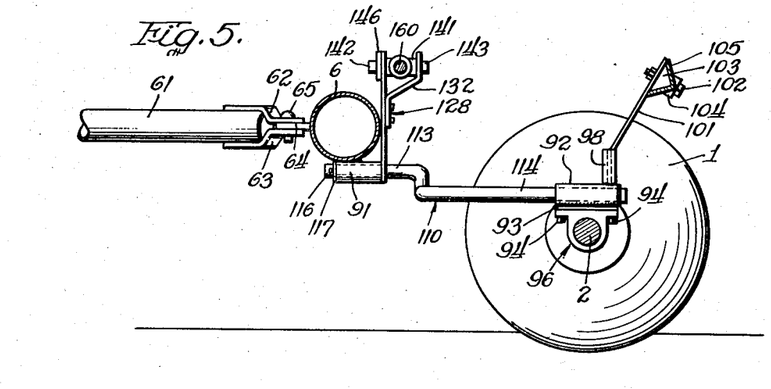
Figure 5 is a sectional view taken generally along the line 5—5 of Figure 1, and showing the draft and bearing connections between the tiller frame and the disk gang units.

Referring particularly to Figure 5, a plurality of transverse bearing sleeves 91 are secured, preferably by welding, to the underside of the main frame pipe 6, and a plurality of companion bearing sleeves 92 are secured to the disks gangs, one for each end portion of each gang. Preferably the gang bearing sleeves 92 are secured directly to the associated gang shaft bearing member 93 as by bolts 94 extending downwardly through openings in the upper portion of the bearing member 93 to which the the bearing sleeve 92 is welded, the member 93 constituting a part of the associated disk gang bearing which is indicated in its entirety by the reference numeral 96. A channeled lug 98 is welded to one end of the bearing sleeve 92 and receives a standard 101. The upper end of the latter is apertured to receive a bolt 102 which extends through a pair of clamping members 103 and 104 between which a scraper support angle 105 is disposed. Scrapers of any suitable construction are mounted on each support angle 105.

Figures 6, 7:
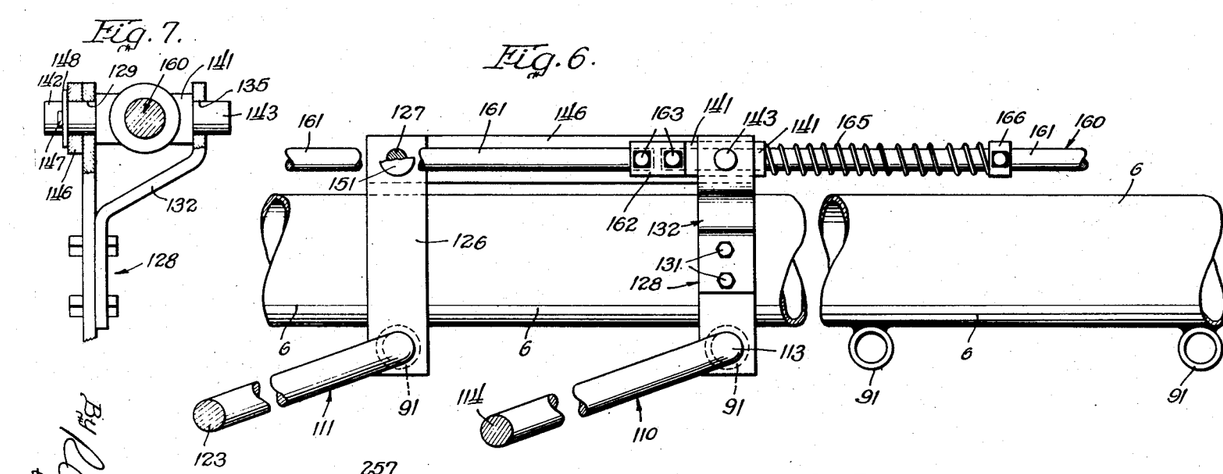
Figure 6 is a detail view showing the interconnection between contiguous end portions of adjacent gangs.
Figure 7 is a detail view of the raising and lowering rod connection.

A bail member 110 is provided for the rear end of each of the disk gangs A, B, etc., and a similar bail member 111 is provided for the forward end of each of said disk gangs. Each rear bail member 110 comprises a generally horizontally disposed arm having its forward end bent forwardly, as indicated at 113, and disposed within the associated main frame bearing sleeve 91. The rear end of the arm member is bent rearwardly, as at 114, and is disposed in the associated disk gang bearing sleeve section 92. Each end of the bail arm is apertured to receive a cotter 116 which, in conjunction with a thrust washer 117, serves to hold the bail in place and take all draft pull transmitted between the frame and that end of the disk gang. The other bail or arm 111 which connects the other end of each gang to the main frame 5 is of similar construction, embodying a bail having a forwardly turned end 122 rockably disposed in the cooperating bearing sleeve section 91 carried by the main frame pipe member 5. The other end of the arm 111 carries a generally rearwardly directed section 123 which is received by the cooperating bearing section 92 mounted on the disk gang bearing unit in the same manner as described above. The several arms 111 employ generally vertically extending sections 126 which are apertured, as at 127, at their upper ends, and the several companion arm or bail members 110 are provided with generally upwardly extending arm sections 128 which are also apertured at their outer ends, as at 129, and are also provided with a pair of apertures to receive bolt or rivet means 131 connecting a hammer strap 132 thereto (Figure 7). The outer end of the hammer strap 132 is apertured, as at 135, and the apertures 129 and 135 of each arm or bail member 111 pivotally carry a sleeve 141 swiveled by trunnions 142 and 143 received, respectively, in the apertures 129 and 135. As best shown in Figure 6, the bail member 110 connected with the rear end of one gang is connected with the forward end of the next rearward gang by a link 146, the ends of which are apertured and are pivotally mounted on an extension of the trunnion 142, being held in place thereon by a cotter 147 and a thrust washer 148. The other end of the link 146 is apertured to receive a pivot 151 which connects the link 146 with the upwardly extending arm section 126 on the associated bail member 111.

Thus, by virtue of the links 146 and associated parts, we have provided a plurality of disk gangs connected together in generally axial relation whereby each gang may have floating action more or less independently of the other gangs but with the rear end of each gang connected to the forward end of the adjacent gang whereby the adjacent ends of the gangs rise and fall together, yet the entire assembly of interconnected disk gangs move upwardly or downwardly so as to accommodate uneven ground and the like.

Figure 4:
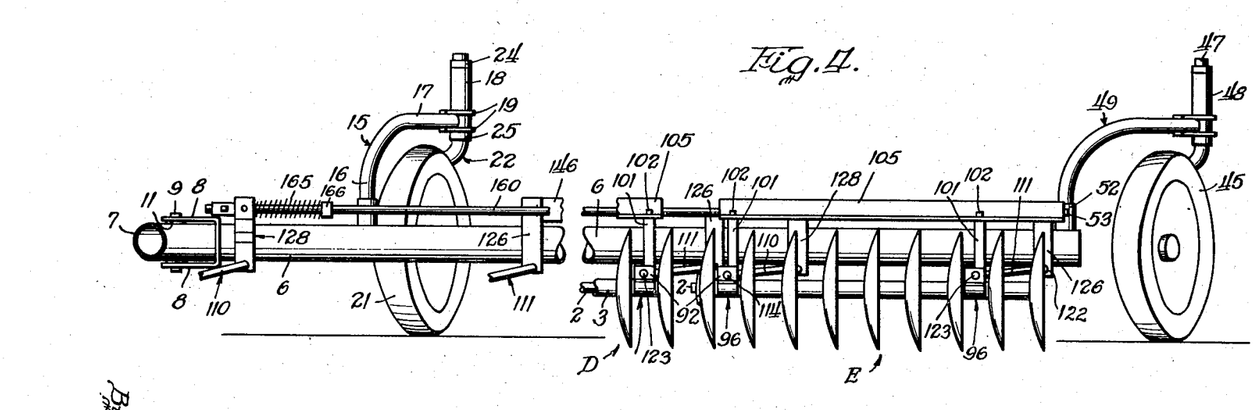
Figure 4 is a rear view of the tiller, looking forwardly generally along the line 4—4 of Figure 1.

A generally longitudinally shiftably raising and lowering rod member 160 is carried in the several sleeves 141, and the rod member 160 may, if desired, be made up of a plurality of rod sections 161 interconnected at their ends by connecting sleeves 162 bolted, as at 163, to the rod sections 161. The raising and lowering rod member 160 carries a compression spring 165 on the forward side of each of the swiveled sleeves 141, and an adjustable set screw collar 166 is disposed on the rod member so as to form an abutment receiving one end of the compression spring 165, the other end of which bears directly against one end of the associated swiveled sleeve 141. Preferably, the interconnecting collars 162 are disposed on the rearward or landward side of each of the swivel sleeves 141 whereby when the rod member 160 is moved to the right (Figures 1, 4 and 6), the interconnecting sleeves 162 engage the associated swiveled sleeves 141 and serve thereby acting through the bail connecting links 146, to rock all of the bails 110 and 111 in a direction to raise the disk gangs out of engagement with the ground and into a transport position. By moving the rod member 160 in the other direction, the disk gangs are lowered into operating position and, if the rod member 160 is forced landwardly, the springs 165 are compressed and apply a yielding downward pressure against the bails for yieldably holding the disks to their work. Also, the yielding of the springs 165 when the implement is arranged for operation permits the disk gangs more or less individually to rise and fall when passing over uneven ground.

According to the principles of the present invention, we provide hydraulically operated means for shifting the raising and lowering rod 160, and to this end a cylinder support bracket 170 is fixed to the forward side of the main frame pipe member 6, being reenforced by a brace 171 (Figure 8) welded to the pipe 6 and the forward portion of the support 170. The latter is apertured to receive bolt means 173 by which a cylinder support strap 174 is secured to the support lug 170 in a forwardly disposed position. The support strap 174 includes an upwardly turned forward end 175 apertured to receive a quick detachable pin 176 (Figure 1) connected to the forward end of the hydraulic piston and cylinder unit 177 thereto. The rear or piston end of the power unit 177 is connected by a quick detachable pin 179 to a link 181 pivotally mounted, as as 182, on a bell crank lever 183. Preferably, the bell crank lever 183 includes a vertically disposed pivot pin 185 welded to the main arm member 186 and also welded to a short bar 187 disposed in spaced relation with respect to the main bell crank member 186. The outer end of the bar 187 is welded to a stop abutment 188 which is also welded to an edge of the main bell crank member 186. The member 188 forms a stop limiting movement of the arm 181 relative to the bell crank 183 in one direction, and when the arm 181 is disposed up against the stop 188, an opening 191 in the outer end of the bar 187 comes into registration with a similar opening 192 formed in the arm 181 and an opening 193 in the adjacent portion of the main bell crank lever 186. A pin 194 (Figure 1) when inserted through the registering openings 191, 192 and 193 locks the parts together. The outer end of the lever 181 is apertured, as at 195, to receive the rear quick detachable pin 179 connecting the cylinder unit 177 to the arm 181. The other end of the bell crank lever 183 carries a swiveled sleeve 201 through which the forward end of the raising and lowering rod member 160 passes, and a pair of set screw collars 203 are fixed to the lifting rod section and form the means whereby oscillation of the bell crank lever 183 shifts the raising and lowering member 160 in one direction or the other. When the pin 195 is in place, connecting the swinging arm 181 with the bell crank lever 183, the cylinder 177 may be retracted or extended to oscillate the bell crank lever 183 by power in one direction or the other, raising or lowering the disks. The pin 185 of the bell crank lever 183 is received in a vertical sleeve 206 welded to the front portion of the main frame pipe 6.

Figure 9:
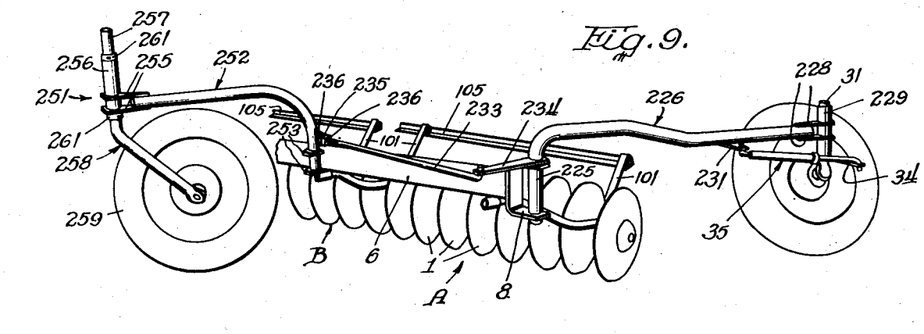
Figure 9 is a fragmentary view showing a modified rear end construction.

In Figure 9 we have shown a modified rear end construction wherein the forward downturned end 225 of a rear furrow wheel axle member 226 is disposed in the rear bifurcated section 8 of the main pipe member 6. The axle member 226 extends rearwardly and carries a pair of upper and lower brackets 228 to which a vertical bearing sleeve 229 is fixed, as by welding. The sleeve 229 receives the spindle 31 of the rear furrow wheel, and the angle or lead of the latter is adjusted, in this form of the invention, in substantially the same way as described above, namely, by a telescopically associated pair of link members 35 pivotally connected rearwardly to the steering arm 34 and at their forward ends to a lug 231 fixed, as by welding, to the rear axle member 226. The lateral position of the rear end of the axle member 226 is adjusted by means of a link 233, the rear end of which is turned upwardly and disposed in an apertured lug 234 welded to the rear axle member 226, the forward end of the link being threaded and extended through an opening in an angle lug 235 that is welded to the upper side of the main pipe member 6. Lock nuts 236 serve to hold the link 233 in different positions of adjustment.

Also, instead of or in addition to the set screw 53 (Figure 4), the front axle member 49 may be held in different positions of lateral adjustment by means of an arm and link construction substantially the same as the members 233 and 234 and associated parts, as just described.

The form of the invention shown in Figure 9 also includes a modified form of land wheel support which will now be described. A land axle bracket 251 includes an L-shaped bar 252 having its rear end turned downwardly and secured, as by welding, in a pair of brackets 253 that are welded to the forward side of the pipe member 6. The main portion of the bracket member 252 extends forwardly and receives a pair of lugs 255 which are welded to the bar 252 and which, in turn, are welded to the lower end of a spindle-receiving sleeve 256. The sleeve 256 receives the spindle section 257 of a land axle member 258 upon which the land wheel 259 is journaled. A pair of set screw collars 261 serve to hold the spindle section 257 in different vertical positions. It will be noted that in this form of the invention the land wheel 259 is disposed generally toward the intermediate portion of the frame, thereby providing for support of the latter at a point between its ends. This serves to prevent undue sagging of the frame during transport when the weight of the plurality of gangs is sustained by the frame.

Figure 10:
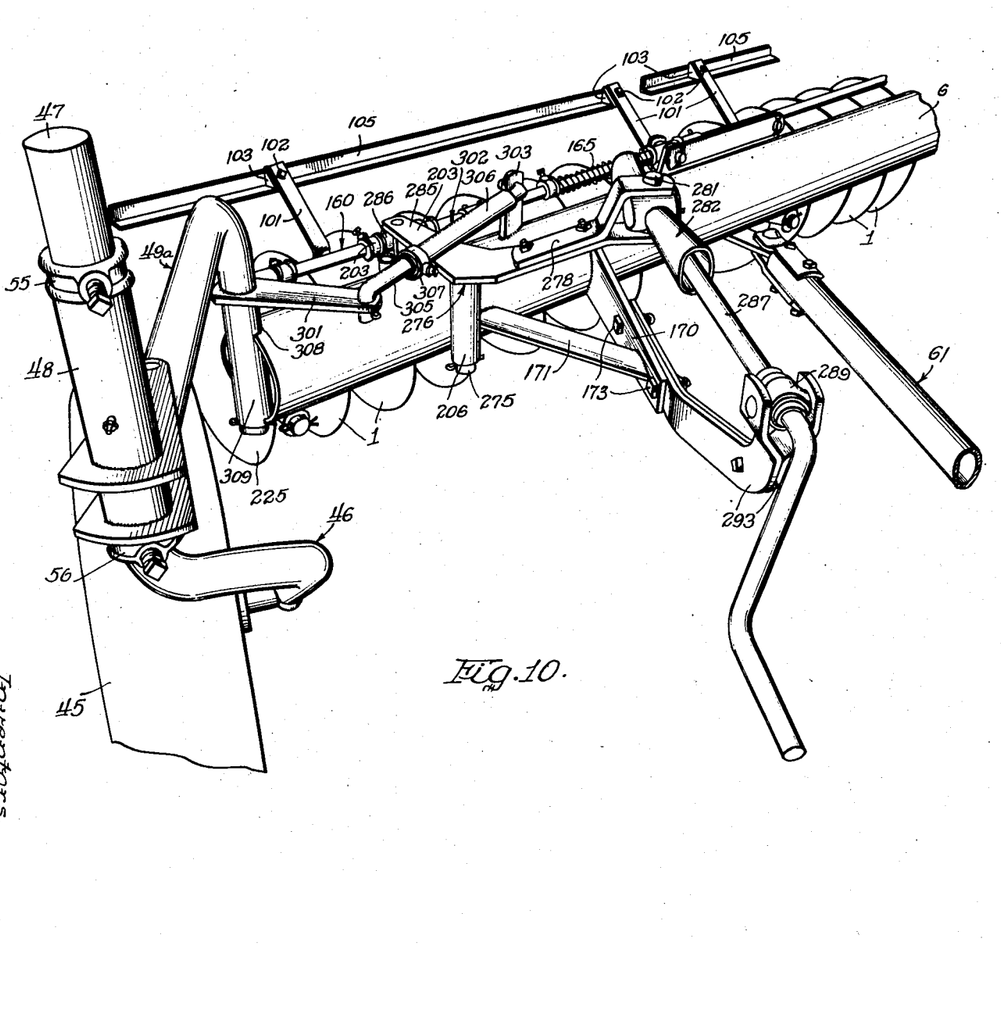
Figure 10 is a modified view of the front portion of a disk tiller showing a crank screw operated lift instead of a power unit operated lift.

For use with tractors that do not include a remote hydraulic cylinder, we provide a crank screw or hand operated type of lift which will now be described. Referring now to Figure 10, a pin 275 forming a part of a bell crank lever 276 is received by the vertical sleeve 206 that is fixed to the front portion of the main frame pipe 6. The bell crank lever 276 includes a hammer strap 278 which is apertured, together with the adjacent portion of the bell crank arm section 279, to which the hammer strap is fixed, thereby forming means for receiving the trunnion sections 281 of a depth screw housing member 282. The other arm section 285 of the bell crank 276 receives a swivel member 286 through which the forward end of the raising and lowering rod member 160 passes, being held in proper relation with respect thereto by the set screw collars 203 mentioned above.

The housing member 282 receives a nut (not shown) which receives the rear threaded end of the depth screw adjusting crank 287, the forward portion of which is journaled for rotation in a swivel 289, the trunnions 291 of which are received in the upper or forward apertured ends of a pair of bracket straps 293 that are bolted to the support bracket 170 in place of the cylinder support member 174 described above. Turning the crank screw 287 in one direction or the other swings the bell crank 276 and thus raises or lowers the disks in substantially the same way as described above in connection with the form of the implement using the hydraulic cylinder.

In this form of the invention the front axle member 49a is held in different positions of lateral adjustment by means of an arm 301 welded to the rear portion of the front axle member 49 and an adjustable link member 302 connected between the end of the arm 301 and an apertured lug 303 on the main frame member 6. Preferably, the adjustable link structure 302 includes a pair of telescopically associated sections 305 and 306 held in different positions by a set screw collar 307. Also in this form the front end of the pipe 6 is notched, as at 308, to receive the sleeve 309, welded thereto, in which the axle 49a is disposed for lateral swinging.

Figure 11:
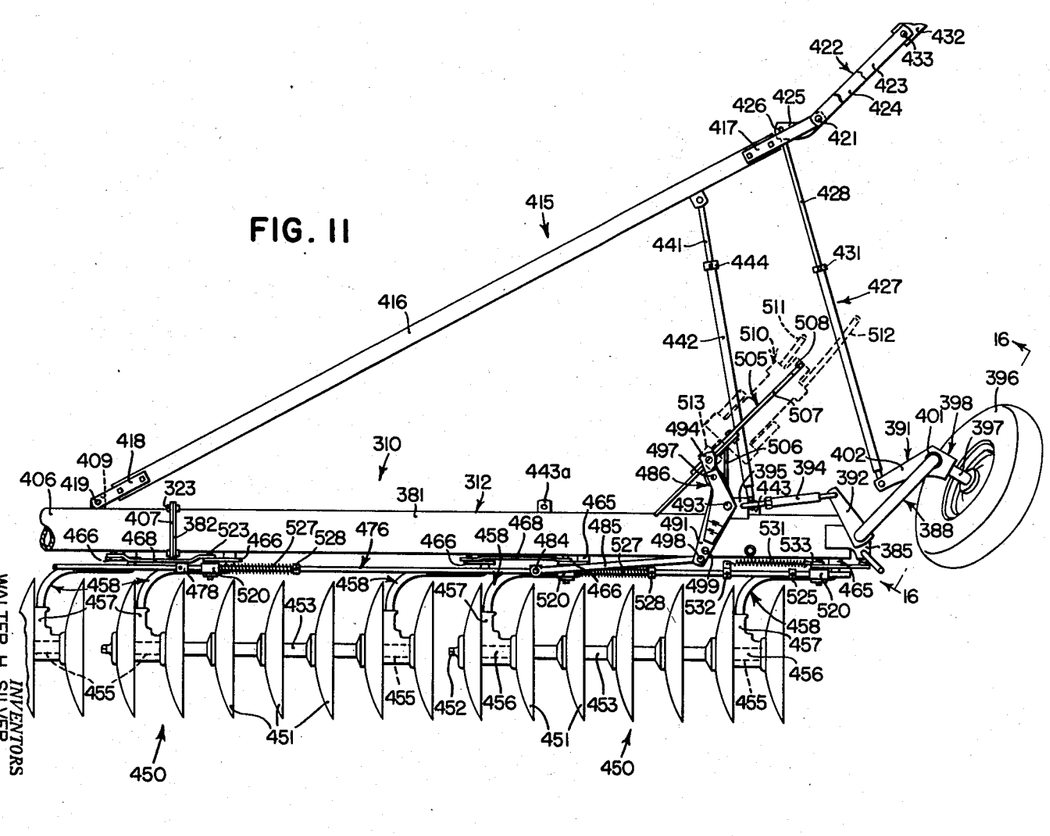
Figures 11, 14:
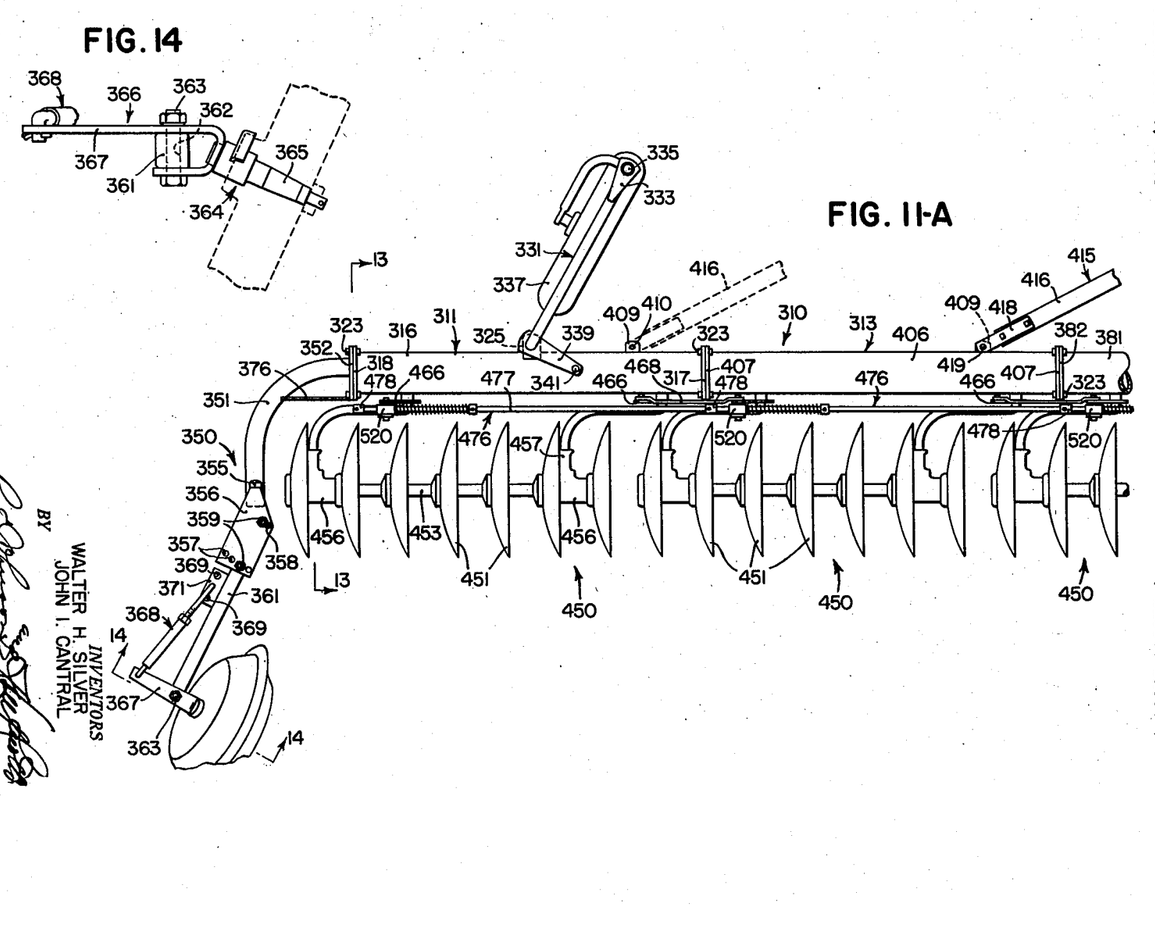

Figures 11 et seq. show another modified form of the present invention in which the construction is such that the tiller may be increased or decreased in length so as to provide for increasing or decreasing the amount of land worked.

Figure 13:
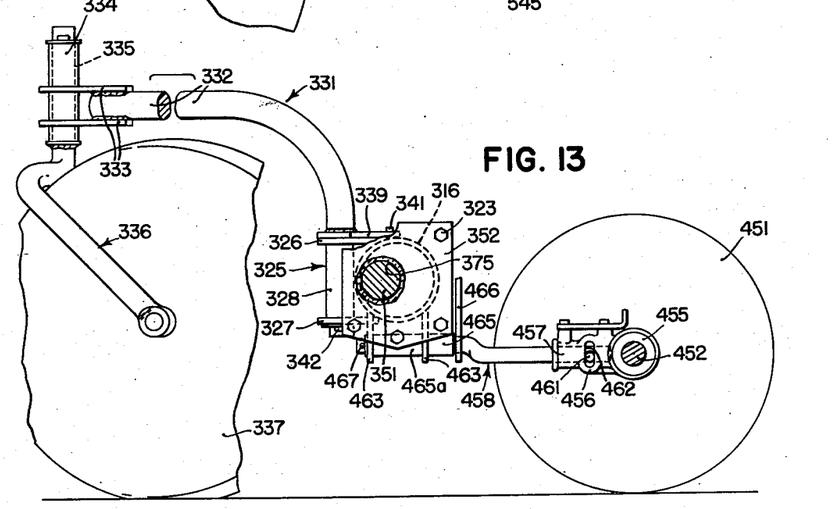
Figure 13 is a sectional view taken along the line 13—13 of Figure 11A.

Referring first to Figures 11 and 11A, the reference numeral 310 indicates a main frame or support, which is generally in the form of a pipe member, made up of a rear pipe section 311, a front pipe section 312 and one or more intermediate pipe sections 313. Each of the pipe or frame sections 311 and 312 and the intermediate pipe sections 313 are preferably of such length that, when the implement is disassembled, transportation, as in ordinary farm trailers or trucks or the like, is facilitated. The rear frame section 311, as best shown in Figures 11A and 13, comprises a tubular or pipe member 316 having a pair of coupling plates 317 and 318 secured, as by welding, to the ends of the pipe 316. Each of the coupling plates 317 and 318 is provided with four apertures and a lower aperture arranged, as best shown in Figure 13, to receive coupling bolts 323. At the forward side the pipe member 316 is provided with a land axle arm bracket 325 which is made up of apertured lugs 326 and 327 welded to the forward side of the pipe member 316 in vertically spaced relation and a vertical bearing sleeve 328 welded to the lugs 326 and 327. A land axle supporting arm 331 is carried by the bracket 325 and comprises a generally L-shaped arm 332 having one end rockably received in the sleeve member 328, the other end of the land axle arm 332 extending forwardly and having a pair of apertured brackets 333 welded thereto, the brackets 333 carrying a vertical sleeve 334 in which the upper spindle portion 335 of a land wheel receiving axle 336 is disposed for rocking movement about a generally vertical axis. A land wheel 337 is mounted for rotation on the lower end of the land axle 336, the wheel-receiving portion of which is disposed rearwardly of the axis of rocking movement, as defined by the sleeve 334, whereby the wheel 331 is free to caster. The rear portion of the land axle arm 332 that is rockably mounted in the bearing sleeve 328 is reduced in diameter below the arm 339. The outer end of the arm 339 is apertured so that when the land axle arm 332 is disposed in position on the frame section 311 the aperture in the outer end of the arm 339 seats over a lug 341 carried by the frame pipe member 316, and thus holds the axle arm 331 against lateral movement. The land axle arm 331 is held in position in the bearing sleeve member 328 by a heavy cotter 342 or other suitable means, the cotter 342 thus holding the parts so that the arm 339 remains engaged with the lug 341.

Figure 15:
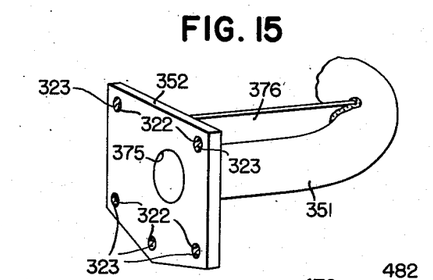
Figure 15 is a fragmentary perspective of one end of the rear frame arm supporting the rear furrow wheel.
Figure 16:
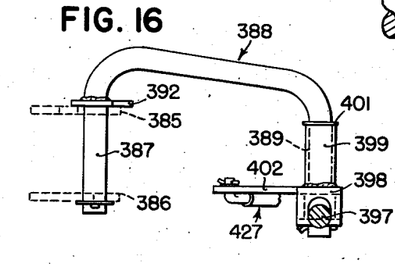
Figure 16 is a detail view of the front furrow wheel support.

The rear end of the tiller is supported on a rear wheel unit indicated in its entirety by the reference numeral 350. The unit 350 includes a rear frame arm 351 which is curved, as best shown in Figure 11A, and at its forward or laterally inner end is provided with a coupling plate 352 which is apertured at 323 (Figure 15), like the plates 317 and 318, to receive the coupling bolts 323 carried by the coupling plate 318 at the rear end of the pipe member 316 which forms a part of the rear frame section 311. The rear end of the rear frame arm 351 is flattened, as at 355, and receives upper and lower clamp plates 356, the forward ends of which are welded or otherwise firmly fixed to the rear end of the rear frame arm 351. The rear ends of the clamp plates 356 are apertured, as at 357, and at the forward end portions the plates 356 are provided with slots 358. A pair of bolts 359 disposed in the slots 358 and selected openings 357 serve to connect a rear axle bar 361 to the clamp plates 356. The rear end of the bar 361 is apertured, as at 362, to receive a pivot bolt 363 by which a rear axle unit 364 is swingably connected with the rear end of the bar 361 to move about a generally vertical axis. The rear end of the unit 364 includes downwardly and outwardly extending wheel-receiving spindle portions 365 and a U-shaped member 366, apertured to receive the pivot bolt 363 and having one arm extended, as at 367. A telescopically adjustable linkage 368 is pivotally connected at its rear end to the outer end of the arm section 367 and at its forward end is pivotally connected in one of a plurality of openings 369 formed in a lug 371 fixed, as by welding, to the outer side of the rear axle bar 361. The lateral position of the rear wheel 372 may be varied as desired by adjusting the position of the bolt 359 in the forward slots 358, and if more adjustment is needed, the rear bolt 359 may be disposed in one of the other rear clamp plate openings 357. The angle of lead of the rear wheel 372 may be adjusted by changing the effective length of the adjustable linkage 368. The coupling plate 352 is provided with a central aperture 375 in which the forward end of the rear frame arm is disposed and fixed thereto, as by welding. The parts are reenforced by a plate 376 welded to the frame arm 351 and the rear side of the coupling plate 352, as best shown in Figure 15.

The forward frame section 312 comprises a pipe or tubular member 381 having a coupling plate 382 welded to the rear end thereof. The coupling plate 382 is apertured like the coupling plates 317, 318 and 352, described above. This makes it possible, as will be pointed out in more detail later, to bolt the coupling member 382 directly to the coupling plate 317 when it is desired to eliminate the intermediate section 313.

A pair of upper and lower brackets 385 and 386 are welded to the front end of the forward pipe member 381. These brackets are apertured to receive the rear or inner end 387 of a front furrow axle arm, indicated in its entirety by the reference numeral 388. The latter member is preferably U-shaped and includes a forward downwardly extending portion 389 on which a front furrow wheel axle unit 391 is mounted for rocking movement. An arm 392 is fixed at its rear end to the front furrow wheel axle section 387 and is apertured at its forward end to receive a telescopically adjustable link member 394 which at its outer end is pivoted to the forward end of the arm 392 and which at its inner end is pivotally connected into an aperture formed in a brackets 395 fixed to the front side of the pipe member 381 inwardly of the outer end portion of the latter. Adjusting the link member 394 serves to swing the front furrow wheel axle arm 388 generally inwardly or outwardly relative to the line of draft so as to dispose a front furrow wheel 396, carried by the front furrow wheel axle unit 391, in the desired lateral position. Structurally, the front furrow wheel axle unit 391 is similar to the rear axle unit 364 described above and comprises a spindle 397 which receives the wheel 396, and a U-shaped part 398 which is apertured to receive a vertical tubular bearing 399, preferably welded to the member 398. The bearing 399 is adapted to be disposed on the forward end 389 of the front furrow wheel axle arm 388, the section 389 carrying a thrust or abutment washer 401 which bears against the upper end of the tubular member 399. One portion of the U-shaped part 398 is extended laterally, as at 402, to serve as a steering arm which is connected to be steered by the forward pivoted drawbar member that forms a part of the hitch structure described below.

The frame unit 310 is completed by one or more intermediate frame sections 313 where it is desired to provide a machine wider than one made up only of frame sections 311 and 312. Like the frame sections just mentioned, the frame section 313 comprises a frame pipe or tubular member 406 having a coupling plate 407 secured to each end thereof. The coupling plates 407 are apertured like the other coupling plates described above whereby the frame section 313 may be bolted in between the frame sections 311 and 312 by clamping bolts 323. A draft bar receiving lug 409 apertured, as at 410, is fixed to the forward side of each intermediate frame section 313 and also to the forward side of the pipe member 316 of the rear frame section 311.

The hitch structure for the disk tiller in this form of the invention is indicated in its entirety by the reference numeral 415 and comprises a main hitch member 416 having pairs of drawbar straps 417 and 418 bolted to the front and rear ends of the main hitch or drawbar member 415. The drawbar straps 418 are apertured to receive a hitch pin 419 which connects the rear end of the drawbar member 415 to the associated frame section 313 when the tiller is arranged as shown in Figures 11 and 11A. The forward drawbar straps 417 extend forwardly from the front end of the main drawbar member 415 a substantial distance and are apertured to receive a pivot pin 421 on which a laterally swingable drawbar arm unit 422 is mounted. The drawbar arm unit 422 includes upper and lower stop members 423 and 424, the latter having a rearwardly and laterally bent steering arm section 425. A pivot pin 426 is secured, as by welding, to the outer end of the steering arm section 425 and receives the forward end of a steering link assembly 427, the rear end of which is pivotally connected to the inner end of the front furrow wheel steering arm 402. The steering link 427 includes a pair of telescopically associated members 428 and 429, the latter being tubular, and the two parts are held in longitudinal adjustment by a set screw collar 431 or other suitable means. The tractor which pulls the disk harrow is represented by a tractor drawbar 432 to which the forward ends of the drawbar straps 423 and 424 are pivotally connected, as by a hitch pin 433. The main hitch or drawbar member 416 is braced by means of a forward brace bar 441 the rear end of which is telescopically associated with a rear brace tube 442, the end of which is pivotally connected to an apertured draft lug 443 fixed to the forward side of the main frame pipe member 381. A set screw collar 444 or other suitable means serves to hold the parts 441 and 442 in any position of longitudinal adjustment. As will be best seen from Figure 11, when the tractor is turned toward one direction or the other, the drawbar arm 422 is swung in one direction or the other and exerts a pull or thrust through the adjustable link unit 427 against the steering arm 402, thus turning the front furrow wheel 386 in one direction or the other. When more than one intermediate frame section 313 is disposed between the rear and front frame sections 311 and 312, it may be desirable to move the hitch structure 416 landwardly, in which case the main drawbar member 415 is pivotally connected to the draft lug 409 of the rearmost frame section 313 and the rear end of the brace unit 442 may be connected to an auxiliary draft lug 443a (Figure 11) fixed to the forward side of the front pipe member 381 rearwardly of the draft lug 443.

Each of the frame sections 311, 312 and 313 carries its own gang of disks, the front frame section 312 carrying two disk gangs. Each gang, indicated by the reference numeral 450, comprises a plurality of concavo-convex disks 451 mounted on a gang bolt 452 and held in spaced apart relation by spools 453. The end spools are formed as bearing members 455 journaled for rotation in bearing housings 456. Each bearing housing 456 includes a forwardly extending tubular section 457 (Figure 13) in which the rear end of an associated draft bail member 458 is disposed, being held in place by any suitable means, such as a pin 461 carried by the rear end of the bail member and extending into slots 462 in the bearing member 456. Each bail member 458 includes a forwardly disposed portion 465 which is disposed in a bearing sleeve or tubular bearing member 465a carried in lugs 463 welded to the underside of the associated frame pipe section. The forward end of each forward bail portion 465 is apertured to receive a pin 467 or the like which holds the bail member in position. An arm 466 is welded or otherwise fixed to the rear portion of the forward section 465 of each bail member 458 and cooperates with the associated pin 467 in retaining the bail in position on the frame.

By virtue of the bail means just described, each disk gang 450 is swingably connected with the associated frame section for generally vertical movement relative thereto whereby either end of each disk gang swings vertically relative to the other end, thus providing a flexible connection between each disk gang and the associated frame or support. Since each frame section carries its own disk gang, the inclusion of an additional frame section and gang, or the removal of one or more of the frame sections and associated gangs, may readily be accomplished whenever it is desired to vary the width of the machine.

The adjacent bail members 458 of proximate gangs 450 are interconnected by means of a link 468. As best shown in Figures 11 and 11A, the ends of each link 468 are offset and the offset ends are apertured to receive pivots carried by the associated bail arms 466. Thus, each link 468 interconnects adjacent bails whereby the adjacent ends of each pair of proximate disk gangs are constrained to move together. Each link 468 is detachably connected with the associated bail arm 458 by pivot means referred to in detail below.

Figure 17:
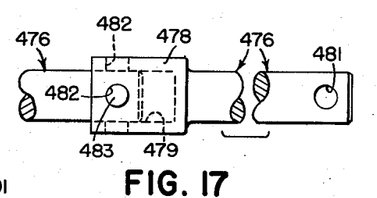
Figure 17 is a detail view showing the connection between the ends of adjacent lift rods.

All of the disk gangs 450 are adapted to be raised into transport position, or lowered into working position, simultaneously by raising and lowering means which preferably is carried by the frame structure 310. Such raising and lowering means comprises a series of interconnected lift rods each of which is indicated by the reference numeral 476. Each member 476 includes an elongated body portion 477 and a squared head portion 478 (Figure 17) having a round socket 479 adapted to receive the end of the adjacent lift rod member 476, which is apertured, as at 481, to receive a quick detachable connecting pin or cotter 483 which is passed through a pair of the openings 482 formed in the socketed head portion 478 of the adjacent lift rod 476. Each lifting rod member 476 is substantially equal in length to the length of the associated frame section 311 or 313.

Figure 12:
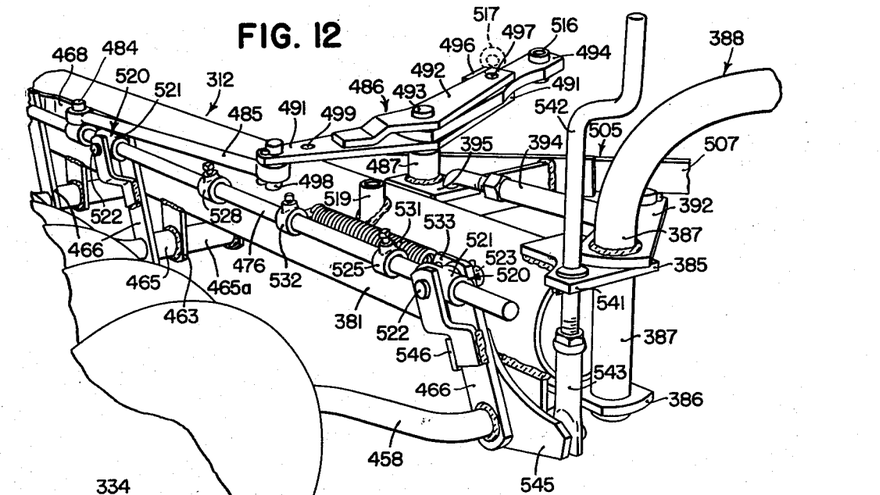
Figure 12 is a fragmentary perspective view of the forward or furrowward end of the disk tiller of Figures 11 and 11A.

As best shown in Figures 11 and 12, the forwardmost lift rod 476 carries a stud 484 on which a link member 485 is pivotally mounted. The other end of the link 485 is connected to a bell crank 486. The bell crank 486 is mounted for rocking movement in a vertically disposed sleeve 487 that is fixed to the bearing bracket 395 and a lower bearing bracket underneath the bracket 395. Preferably, the brackets just mentioned are welded to the forward portion of the pipe member 381 of the front frame section 312. The bell crank 486 comprises a main lever member 491 and a hammer strap member 492 welded to a stub shaft 493 with the hammer strap 492 spaced from the member 491 a distance sufficient to receive a pivoted link member 494 therebetween, the inner end of which is pivotally mounted on the upper end of the stub shaft 493. An abutment plate 496 is welded to the edges of the hammer strap 492 and the lever member 491 so as to serve as a stop for limiting the swinging movement of the link member 494 relative to the main bell crank member 491 in one direction, and when the link member 494 engages the stop 496, holes 497 in the several members come into registry. A pin 498 is welded to the outer ends of the bell crank member 491 and pivotally receives the forward end of the lift rod actuating link 485. An auxiliary opening 499 is formed in the end of the lever member 491. The purpose of this additional opening is described below.

A power cylinder support 505 (Figure 11) is welded to the pipe 381 adjacent the bell crank 486 and extends generally in the normal line of travel of the machine in operation. The bracket 505 is reenforced by a brace strap 506, and the bracket 505 includes a forward extension 507 which turns upwardly, as at 508, and is apertured to receive the forward end of a power cylinder 510, which may be of any suitable construction, so far as the present invention is concerned. Preferably, the unit 510 is in the nature of a double acting cylinder having fluid directed thereto through either of two hose lines 511 and 512. The piston 513 of the unit 510 is connected by a quick detachable pin to the outer end of the link 494 of the bell crank 486, and for this purpose the outer end of the link 494 is apertured in which a cylinder-receiving bushing 516 is carried. When the power control unit 510 is in place and operated to bring the link 494 up against the stop 496, a pin 517 may be inserted through the registering openings 597. To bring the disk gangs in their raised position the unit 510 is extended its full amount. This brings the opening 499 into registry with a short sleeve 519 welded on the forward portion of the pipe 381. So long as the cylinder 510 is extended the link 494 is held against the abutment 496, and the pin 517 takes no pressure. Therefore, when the disk gangs are held in their raised position, it is easy to remove the pin 517 from the openings 497 and place the pin 517 in the aligned openings 499 and 519. To remove the power unit 510, the latter is retracted slightly, the link 494 moving away from the stop 496 whereby the pressure of the connecting pin against the bushing 516 is relaxed. The other end of the cylinder 510 may then readily be disconnected from its support 508.

As will be clear from Figure 11, extension of the cylinder unit 510 causes right hand or forward movement of all of the interconnected lift rods 476. This movement is transmitted to the several bail members 458 through swivel members 520 one of which is connected to each rear bail of the pairs of bails 458 that connect the several gangs to the frame 310. Each swivel member 520 includes a tubular body portion 521 through which the associated lift rod 476 passes and a pair of trunnions 522 and 523, the latter being somewhat longer than the trunnion 522. The longer trunnion section 523 of each swivel member 520 is extended through the opening in the associated arm 466 on the rear bail of each pair of bails. The trunnion section 523 of each swivel member also serves as a pivotal connection for the front end of the associated detachable connecting link 468 which is held detachably connected therewith by a cotter or the like, each link 468 serving to interconnect adjacently mounted bails, as explained above. When the cylinder unit 510 is extended and the lift rod sections 476 shifted forwardly, the head portions 478 (Figures 11 and 11A) on several lift rods engage the tubular portion 521 of each of the several swivel members 520 and, acting through the intermediate connecting links 468, thus serve to swing all of the bails 458 upwardly to raise the several disk gangs 450 into their raised or transport position. At the forward end of the forward lift rod 476, a set screw collar 525 (Figures 11 and 12) is fixed on the rod 476 in a position to engage the tubular section 521 of the forwardmost swivel member 520 to raise the forward end of the forwardmost disk gang 450.

A compression spring 527 is disposed about each of the lift rods 476 immediately ahead of the associated swivel member 520, and a set screw collar 528 serves as an abutment by virtue of which retraction of the cylinder unit 510, acting to force the lift rods 476 rearwardly, acts through the set screw collars 528 and the springs 527 to yieldingly force the outer ends of the bail members downwardly and thus hold the disk gangs to their work. However, if the terrain should be uneven either end of each disk gang may rise or fall relative to the other end to accommodate such unevenness. However, adjacent ends of the disk gangs move together by virtue of the interconnecting links 468, whereby uniform work is performed. When forcing the gangs to their work, the front end of the forward gang is forced downwardly by virtue of a tension spring 531 which is connected at its rear end to a bracket 532 clamped to the forward portion of the forward lift rod 476, the forward end of the spring 531 being connected by a link 533 with the longer trunnion portion 523 of the forwardmost swivel member 520.

Since the forwardmost end of each disk gang normally tends to run somewhat deeper than the rearmost end, it will be seen that the interconnecting links 468, which cause the ends of adjacent gangs to move up and down together, serve to balance the downthrust of the forward end of each gang against the upthrust of the rear end of the next forward gang. In order to keep the forward end of the forwardmost disk gang from running too deep, we provide adjustable stop means which will now be described. An apertured bracket 541 is fixed to a rear extension on the upper rear axle supporting bracket 385 and carries a crank screw 542, the lower end of which is threaded into a sleeve 543. A collar fixed to the crank screw 542 above the bracket and the detachable cotter or pin carried by the crank screw below the bracket 541 serve to prevent vertical movement of the crank screw 542 relative to the tiller frame. The lower end of the threaded bushing 543 is pivotally connected to a generally vertically disposed bell crank 545 swingably mounted on the axle portion of the forwardmost bail 458. The generally upwardly extending portion of the bell crank 545 carries an abutment stop 546 with which the adjacent portion of the crank arm 466 on the forwardmost bail member 458 abuts. The bell crank 545 is normally held against movement by the crank screw 542 and, as best shown in Figure 12, the forwardmost end of the forward disk gang 450 is prevented from running too deep by virtue of the arm 466 coming into contact with the abutment stop 546 on the bell crank 545.

Figure 18:
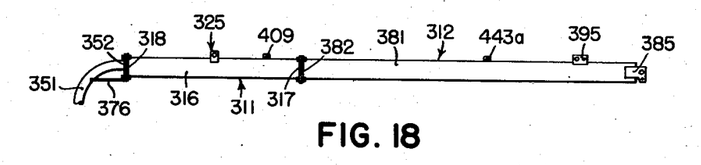
Figure 18 is a fragmentary plan view of the implement frame, showing the frame with one frame section and the associated disk gang section removed for the purpose of reducing the width of cut.

The general operation of the form of the invention shown in Figures 11 et seq. is substantially the same as described above except that, of course, turning of the tractor relative to the implement will turn the front furrow wheel through the steering linkage 427 and associated parts. The lateral position of the forward end of the front furrow wheel supporting member 388 may be adjusted by adjusting the effective length of the linkage 394. Second, the operating width of the machine may be changed by taking out or adding frame sections 313 and associated disk gangs. For example, if it should be desired to reduce the width of the machine shown in Figure 11, all that it is necessary to do is to remove the bolts 323 holding the intermediate frame section 313 in place and disconnect the associated links 468 and the associated lift rod section 476. The forward end of the rear lift rod 476 may then be connected with the rear end of the forwardmost lift rod 476 and one of the links 468 connected between the forward bail 458 for the rearmost gang to the rear bail of the second lift gang. If necessary, the lateral position of the forward end of the hitch structure 415 may be varied by adjusting the lengths, respectively, of the bracing structure 441, 442 and the steering linkage 427. If it should be desired to increase the operating width of the machine an additional frame section 313, together with associated disk gangs and lift rods may be inserted either ahead of or behind the intermediate frame section 313 shown in Figure 11. If more than two or three additional frame sections are to be added, it may be desirable to utilize, as one of the additional frame sections, the frame section 311, together with its land wheel 337 and associated parts in order to provide for adequate support for such lengthened frame. A frame reduced in length is shown in Figure 18.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is:

1. A disk tiller comprising a frame, a plurality of axially aligned gangs of disks disposed generally rearwardly of said frame, an arm pivotally connecting each end of each gang with said frame, each arm including a generally horizontal section lying rearwardly of said frame, a generally forwardly extending portion pivotally connected with said frame, and a generally rearwardly extending portion pivotally connected with the associated gang, said forwardly and rearwardly extending portions being offset laterally and the pivot axes of the pivot connection between said portions and the frame and gang extending generally transversely with respect to the lateral axes of both said frame and gang, and means connected with each arm for raising all of said gangs relative to said frame.

2. A disk tiller comprising a support, a plurality of axially aligned disk gangs, an arm pivotally connecting each end of each gang to said support, each arm extending generally horizontally and having a forwardly extending portion at one end and a generally rearwardly extending portion at the other end, means rockably connecting one portion of each arm with said support for movement relative thereto about a transverse axis, means connecting the other portion of each of said arms with the associated gangs for movement relative to the latter about an axis parallel to said first-mentioned axis, whereby said gangs are capable of generally vertical movement relative to said support, either end of each gang being movable, relative to said support, independently of the other end, the axes of pivotal connection of said forwardly and rearwardly extending arm portions lying transversely with respect to said support and gangs, and means interconnecting adjacent arms for movement together relative to said support so as to cause adjacent ends of said gangs to move together.

3. An agricultural implement comprising an elongated support, an elongated ground-engaging unit, a part movable on said support, a pair of arms generally horizontally disposed pivoted to said support in spaced apart relation along said support and each movable relative to said support about a transverse axis, means pivoting said arms, respectively, to the end portions of said unit for movement about transverse axes spaced generally horizontally along said support from said first-mentioned transverse axes, the axes of said pivotal connection of each arm to said support and the associated unit being generally transverse with respect to said support and unit, stops on said part engageable with said arms when said part is moved in one direction for raising said unit, and a pair of spring means carried by said part and disposed in spaced apart relation so as to act against said arms, respectively, when said part is moved in the other direction for yieldably holding each end of said unit in its ground working position.

4. A disk tiller comprising a frame including a diagonally extending frame member, a plurality of disk gangs disposed in axially aligned relation with the front end portion of one disk gang disposed adjacent the rear portion of the next adjacent disk gang, arm members extending generally longitudinally of said frame member, each hingedly connected at its forward end to said frame member for generally up and down swinging, means hingedly connecting the rear portions of said arm members with the end portions of said gangs, said arm members being rigid, whereby draft may be transmitted from said frame member to said gangs, and means movably interconnecting the arm members that are connected with contiguous end portions of adjacent gangs whereby the adjacent ends of each pair of adjacent gangs may rise or fall relative to the opposite end portions thereof.

5. A disk tiller comprising a frame including a generally diagonally extending frame member, a plurality of disk gangs arranged in axially aligned relation, each disk gang having a bearing adjacent each end thereof, a plurality of spaced sleeve members fixed to the lower portion of said frame member in generally transverse position, a plurality of arms, each having a forwardly directed section rockably mounted in the associated sleeve member on the underside of said frame member, the rear portion of each of said arms having a rearwardly directed section, means on each disk gang bearing for receiving the rearwardly directed section of the associated arm, whereby said arms serve to connect said disk gangs with said frame member in draft transmitting relation, an extension on each of said arms extending generally directly upwardly, a swivel carried at the outer end of each of said extensions, and a rod member carrying means engageable with said swivels for swinging the latter and said arms to raise or lower said disk gangs.

6. A disk tiller comprising a frame including a generally diagonally extending bar having transverse journal members fixed to said bar in spaced relation, a disk gang having bearings at its end portions, each of said bearings having a transverse journal section, and a pair of arms pivotally connecting the end portions of said disk gang with said frame bar, each of said arms including a forward section rockably mounted in the associated journal member on said frame bar and a rearwardly directed section received in the associated journal member carried by the disk gang bearing, stop members fixed to the front and rear ends of said arms for holding the end portions of the latter in said journal members so as to provide for the transmission of draft between said frame bar and said disk gang while accommodating independent movement in a generally vertical direction of either end of said disk gang relative to the other end, upward extensions fixed to the forward portions of said arms and rockable with the latter adjacent the rear side of said frame bar, and means connected with said extensions for raising and lowering said disk gang.

7. A disk tiller comprising a frame including a generally diagonally extending frame member, a plurality of disk gangs arranged in axially aligned relation generally rearwardly of said diagonally extending frame member, each disk gang having a bearing adjacent each end thereof, a plurality of normally horizontal arms, each having a forwardly directed section rockably mounted on said frame member for movement relative thereto about a transverse axis and a rearwardly directed section, means on each disk gang bearing for receiving the rearwardly directed section of the associated arm, whereby said arms serve to connect said disk gangs with said frame member in draft transmitting relation with each end of each disk gang adapted to move independently, relative to said frame member, of the other end thereof, means interconnecting adjacent arms for causing them to swing together, whereby the adjacent ends of the associated gangs are connected to move generally vertically together, an extension on each of said arms extending generally upwardly and located adjacent the rear side of said diagonally extending frame member, and means carried by said frame member and connected with said extensions to raise or lower said disk gangs.

8. A disk tiller comprising a frame including a generally diagonally extending frame member, a plurality of disk gangs arranged in axially aligned relation, a pair of generally vertically swingable arms swingably connecting the end portions of each gang with said frame member, each of said arm means having its end portions offset laterally with respect to the longitudinal axis of said frame and said gangs, means interconnecting the adjacent arms of contiguous disk gangs, a part fixed to the rearmost arm of each of said pairs of arms, a part fixed to the forward arm of the forwardmost gang, gang raising and lowering means carried by said frame and including a member shiftable longitudinally of said frame member, means connecting said member with all of said parts, and means on the frame for shifting said member.

9. A disk tiller comprising a frame including a generally diagonally extending frame member, a plurality of disk gangs arranged in axially aligned relation, a pair of generally vertically swingable arms swingably connected between the end portions of each gang and said frame member, means on the latter and each end of each gang for causing said arms to swing relative thereto about axes extending transversely of said gang bearings and said frame member, means interconnecting the adjacent arms of contiguous disk gangs, a generally upwardly extending part fixed at its lower end to each of said arms, a motion transmitting link connection between the parts fixed to each pair of contiguously disposed arms, whereby one end of each gang is constrained to move with the contiguous end of the next adjacent gang, rod means extending along said frame member and slidably connected with the forwardmost part and the rearmost part and with one part of each of said pairs of link-connected parts, an abutment carried by said rod means at one side of each of the parts with which said rod means is slidably connected, a spring carried by said rod means and disposed against the other side of each of said last mentioned parts except the forwardmost part, means on the forward end portion of said frame member for shifting said rod means in one direction so as to cause said abutments to engage the associated parts and swing said arms to raise said gangs, and in the other direction to act through said springs to yieldably force said gangs downwardly, and a tension spring acting between the forwardmost part and said rod means rearwardly of said forwardmost part.

10. A disk tiller comprising a frame including a generally diagonally extending frame member, a plurality of disk gangs arranged in axially aligned relation, a pair of generally vertically swingable arms swingably connected between the end portions of each gang and said frame member, means on the latter and each end of each gang for causing said arms to swing relative thereto about axes extending transversely of said gang bearings and said frame member, means interconnecting the adjacent arms of contiguous disk gangs, a generally upwardly extending part fixed at its lower end to each of said arms, a motion transmitting link connection between the parts fixed to each pair of contiguously disposed arms, whereby one end of each gang is constrained to move with the contiguous end of the next adjacent gang, rod means extending along said frame member and slidably connected with the forwardmost part and the rearmost part and with one part of each of said pairs of link-connected parts, an abutment carried by said rod means at one side of each of the parts with which said rod means is slidably connected, and means on the forward end portion of said frame member for shifting said rod means in one direction so as to cause said abutments to engage the associated parts and swing said arms to raise said gangs.

11. A disk tiller comprising a frame including a generally diagonally extending frame member, a plurality of disk gangs arranged in axially aligned relation, each disk gang having a bearing adjacent each end thereof, a plurality of spaced sleeve members fixed to the lower portion of said frame member in generally transverse position, a plurality of arms, each having a forwardly directed section rockably mounted in the associated sleeve member on the underside of said frame member, the rear portion of each of said arms having a rearwardly directed section, means on each disk gang bearing for rockably receiving the rearwardly directed section of the associated arm, whereby said arms serve to connect said disk gangs with said frame member in draft transmitting relation, each of said arm sections extending generally laterally with respect to the longitudinal axes of said frame and gangs and said sections being relatively offset laterally with respect to one another, an extension on each of said arms extending generally directly upwardly, and means engageable with said extensions for swinging the latter and said arms to raise or lower said disk gangs.

12. The invention set forth in claim 8, further characterized by means on each of said parts for slidably receiving said shiftable member and abutments fixed to said shiftable member adjacent said parts, whereby movement of said shiftable member in one direction acts to swing all of said arms and raise all of said gangs relative to said frame member.

13. The invention set forth in claim 12, further characterized by spring means carried by said shiftable member adjacent all of the parts and acting against the latter for yieldably urging the associated ends of the gangs downwardly when said shiftable member is moved in the other direction.

14. The invention set forth in claim 8, further characterized by said first mentioned parts being fixed to the forward portions of the associated arms adjacent the rear side of said frame member and the rear ends of the associated bearing sleeves.

WALTER H. SILVER.
JOHN I. CANTRAL.

References Cited in the file of this patent

UNITED STATES PATENTS

| Number | Name | Date |
|---|---|---|
| 1,216,123 | Howe | Feb. 13, 1917 |
| 1,635,019 | Walton | July 5, 1927 |
| 1,670,838 | Boda | May 22, 1928 |
| 1,805,974 | Campbell | May 19, 1931 |
| 1,832,649 | Orelind | Nov. 17, 1931 |
| 2,008,483 | Ball | July 16, 1935 |
| 2,070,425 | Engel | Feb. 9, 1937 |
| 2,245,374 | White | June 10, 1941 |
| 2,377,410 | Field | June 5, 1945 |

FOREIGN PATENTS

| Number | Country | Date |
|---|---|---|
| 19,514/29 | Australia | Apr. 7, 1930 |